United States Patent [19]

Crihan

[11] Patent Number: 4,765,655

[45] Date of Patent: Aug. 23, 1988

[54] RADIOISOTOPE MARKING OF ART OBJECTS IN VIEW OF THEIR RAPID IDENTIFICATION

[76] Inventor: Ioan G. Crihan, 417 E 64th St. No. 4G, New York, N.Y. 10021

[21] Appl. No.: 854,576

[22] Filed: Apr. 22, 1986

[51] Int. Cl.$^4$ .................. B42D 15/00; G21G 4/00; G21H 5/00; A61N 5/12

[52] U.S. Cl. .................. 283/70; 250/303; 250/493.1; 427/5

[58] Field of Search .................. 283/69, 70; 250/302, 250/303, 643.1, 281, 303, 493.1; 436/2, 804; 427/5, 77, 271, 282

[56] References Cited

U.S. PATENT DOCUMENTS

| | | | |
|---|---|---|---|
| 3,707,353 | 12/1972 | Kubiatowicz | 250/493.1 |
| 4,016,418 | 4/1977 | Horrocks et al. | 250/303 |
| 4,019,053 | 4/1977 | Levine | 250/303 |
| 4,230,671 | 10/1980 | Kaartinen | 250/303 |
| 4,275,300 | 6/1981 | Abbott | 250/303 |

FOREIGN PATENT DOCUMENTS 1187451  4/1970  United Kingdom .................. 283/70

*Primary Examiner*—E. R. Kazenske
*Assistant Examiner*—Paul M. Heyrana
*Attorney, Agent, or Firm*—Eric P. Schellin

[57] ABSTRACT

A method for rapid identification of art objects or other valuables. Oil paintings, sculptures and other valuable objects are coded with radioisotopes at a specific X,Y,Z coordinate system. The exact location of the isotope and a measurement of the emitted radiation are recorded for future use to show the art object, or any other valuable object, has been destroyed, stolen, lost, or duplicated.

3 Claims, 2 Drawing Sheets

Fig. 4

ISOMARK NUMBER _____
ISOMARK'S LOCATION:   X _____
                       Y _____

1. PAINTING
☐ (a) OIL
☐ (b) WATERCOLOR
☐ (c) GOUCHE
☐ (d) TEMPERA
☐ (e) ACRYLIC
☐ (f) COLLAGE
☐ (g) MONTAGE
☐ (h) MIXED MEDIUM
☐ (i) OTHER (describe)

2. DRAWING
☐ (a) PEN & INK
☐ (b) CRAYON
☐ (c) PENCIL
☐ (d) PASTEL
☐ (e) CHARCOAL
☐ (f) COLLAGE
☐ (g) MIXED
☐ (h) OTHER (describe)

3. PRINT
☐ (a) ETCHING
☐ (b) ENGRAVING
☐ (c) LITHOGRAPH
☐ (d) LINOCUT
☐ (e) SILKSCREEN
☐ (f) BATIK
☐ (g) WOODCUT
☐ (h) AQUATINT
☐ (i) OTHER (describe)

4. GROUND
☐ (a) CANVAS
☐ (b) COMPOSITION
☐ (c) PAPER
☐ (d) WOOD
☐ (e) OTHER (describe)

5. SCULPTURE
☐ (a) BRONZE
☐ (b) WOOD
☐ (c) MARBLE
☐ (d) STONE
☐ (e) STEEL
☐ (f) FIBERGLASS
☐ (g) CLAY
☐ (h) PLASTER
☐ (i) MIXED
☐ (j) OTHER (describe)

6. PHOTOGRAPHY
☐ (a) BLACK & WHITE
☐ (b) COLOR
☐ (c) SEPIA
☐ (d) TINT

7. FINISH (photograph)
☐ (a) MATTE
☐ (b) GLOSSY

8. SUBJECT OF WORK
☐ (a) LANDSCAPE
☐ (b) SEASCAPE
☐ (c) CITY SCAPE
☐ (d) INTERIOR
☐ (e) PORTRAIT
☐ (f) FIGURE STUDY
☐ (g) RELIGIOUS
☐ (h) STILL LIFE
☐ (i) ABSTRACT
☐ (j) ANIMAL
☐ (k) OTHER (describe)

9. FABRICATION (sculpture)
☐ (a) CARVED
☐ (b) CASTING
☐ (c) WELDED
☐ (d) OTHER (describe)

11. SCHOOL OF ART
☐ (a) REALISM
☐ (b) EXPRESSIONISM
☐ (c) IMPRESSIONISM
☐ (d) ABSTRACT
☐ (e) SURREALISM
☐ (f) OTHER (describe)

10. OTHER
☐ (a) TAPESTRY
☐ (b) GLASS
☐ (c) STAINED GLASS
☐ (d) MOSAIC
☐ (e) CARVED IVORY
☐ (f) OTHER (describe)

ARTIST _____  TITLE OF WORK _____
TITLE _____
COUNTRY _____  DATE OF WORK _____
IS WORK SIGNED   ☐ YES   ☐ NO          WEIGHT _____
DIMENSIONS _____
DOMINANT COLOR OF WORK _____
APPROXIMATE VALUE OF WORK _____
DESCRIPTION OF WORK ✱ _____

RADIOISOTOPE MARKING OF ART OBJECTS IN VIEW OF THEIR RAPID IDENTIFICATION

BACKGROUND OF THE INVENTION

The present invention relates to a method for rapid identification of art objects and, in particular, the use of radioisotopes to mark art objects or any other valuables.

In order to insure valuable art objects, complete descriptions and any identifying marks are kept as records by insurance companies. Often identifying marks are merely the artist or author's signature which like the original can be skillfully duplicated by a forger. It is possible that an insurance company will use its own identifying mark placed in some obscure place; however, when such a mark is used it is usually a physical etching or something similar. The problem with physical marks is that they can be removed, either by accident or on purpose.

In addition to identifying marks, insurance companies rely on physical evidence such as the artist's style, signature and the materials used in producing the art work. Some forgeries have been so close to the artist's style that even the better experts have been fooled. To make a positive identification, an art object is tested to see if the materials used were available to the artist. Paints, in particular, have been changed over the years since most pigments came from natural sources in the region where the artist lived. Today, many pigments are synthetically produced and shipped around the world. However, to make physical and chemical tests of the paints requires removing small amounts from the painting, which is not practical.

The present invention overcomes the problems which hampered art identification by placing a small micro-dot of a radioactive material at a specific location on the work of art.

SUMMARY OF THE INVENTION

The invention relates to a method of rapidly identifying art objects without physically or chemically testing the materials. The art object is marked with a micro-dot of a radioisotope, at a specific location using X,Y,Z coordinates to identify the location. The radioactivity of the isotope is measured and this measurement and the location of this isotope are recorded for future use to identify the art object.

DESCRIPTION OF THE INVENTIO

Figure 1:
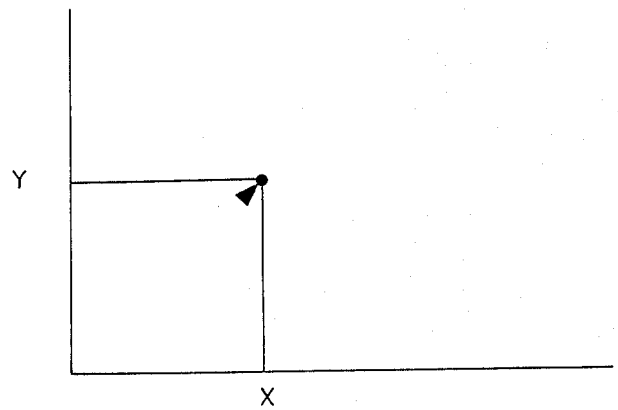
FIG. 1 is a plane view of a painting showing the method of coding by the present invention.
Figure 2:
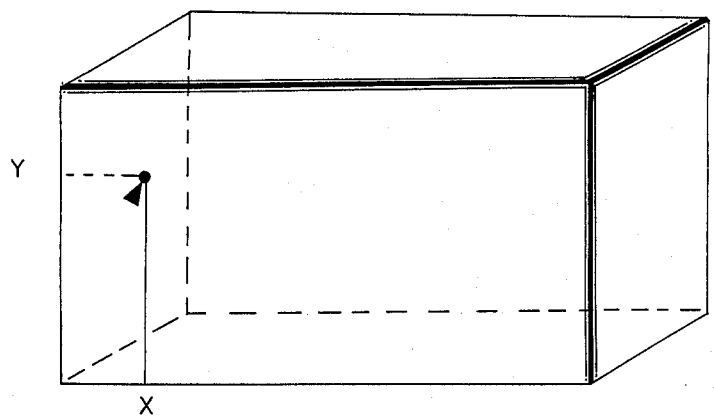
FIG. 2 is a cross sectional view of the painting of FIG. 1 showing a code implanting tool.
Figure 3:
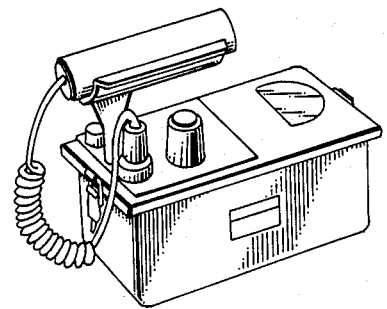
FIG. 3 shows a typical identification card for recording information about the identification code.

Referring to the drawings, there is disclosed a typical painting in FIG. 1 and a method for locating an isotope micro-dot where it can be later identified. Using X and Y coordinates, a site is located for placing the micro-dot (e.g. 1,1 in FIG. 1). In FIG. 2, the micro-dot is impregnated into painting with a hypodermic type syringe or a similar device. In FIG. 2, the micro-dot is at position (1,1,0.01). The exact location is registered on a record card, FIG. 3, giving the X,Y,Z coordinates. A quantitative radioactivity detection device measures the level of radiation emitted by the micro-dot and the measurement is recorded on the record card. The information on the record card (FIG. 3) is later transferred to a computer for easy retrieval by the authorized authorities.

The art identification method of the present invention is specifically directed to works of art wherein a radioisotope can be safely applied without causing damage to the art object or to persons coming in contact with the art object. The use of a micro-dot of certain isotopes has been acceptable in most all situations.

A radioisotope is mixed with a polymeric resin for bonding to the canvas in a painting or the material of a sculpture. One of the resins which has been successful as a bonding agent is an epoxy resin. One of the isotopes may be chosen from among: Am-241, Bi-209, C-14, I-129, Pl-190, Pl-192, or Ra-226. It is mixed with the resin and carefully applied, with a micro-pipette, to the canvas back of a painting. For a metal object it is preferable to apply the micro-dot with an electroplate point. The isotope in the micro-dot would have an approximate value in the range of under 1 liter. It is possible to apply the micro-dot and then measure the position in the X,Y,Z coordinates or to measure a position and then apply the micro-dot. In either case, the measurement of the micro-dot position and its activity must be actually measured for recording in a computer.

The following example is a method of marking an oil painting for identification and programming the data for future references in a computer:

EXAMPLE

A radioisotope is prepared by mixing the chosen isotope with a glyptal resin. An oil painting is measured from the lower left hand corner, using the height of the painting as the Y coordinate and the width as the X coordinate. The painting can be positioned with either front or back side up, The radioisotope and resin mixture is carefully applied at the intersection of the X,Y coordinates using a micro-pipette (either by depositing it on the surface or injecting it into the structure of the object).

A computer program used to identify and index objects of art (e.g. a marked oil painting) would contain the location of the micro-dot, the radiation activity readings, the title and the owner's name and address. Any other relevant information pertaining to the description would also be stored in the computer reference. Photographs of the object, taken at the time of marking would be kept separately.

At any time, the oil painting can be rapidly identified by checking the computer index for the location of the micro-dot and its radiation activity measurement and comparing these to the corrected readings, if any, of the painting in question. Since varying amounts of radioisotopes give different measurements, each painting's activity measurement is like a fingerprint. No two paintings will have the same amount of isotope. The activity measurement is always corrected for radioactive decay.

I claim:

1. A method for rapidly identifying art objects, or other valuables comprising (1) placing an identification measurable radioisotope mark on said objects or valuables, at a specific X, Y position coordinate or X, Y, Z position coordinate, (2) measuring the radioactivity of said mark, (3) recording said mark position and said radioactivity for future use, and (4) detecting said identifiable mark by conventional radioactive detection apparatus connected to a scalar and a ratemeter.

2. A method of claim 1 wherein the art objects or other valuables is marked at a specific X, Y position coordinate, wherein:
  (a) for non-metallic objects or valuables a radioisotope and a resin are mixed and a small hidden amount of the mixture is placed at said coordinate with a micro pipette; and
  (b) for metallic objects or valuables an electroplate point is used t place a small hidden amount of said radioisotope at said coordinate.

3. A method as in claim 1 or 2 wherein the radioisotope is either Am-241, Bi-209, C-14, I-129, Pl-190, Pl-192, or Ra-226.

* * * * *